United States Patent
Yamada

[11] 4,013,348
[45] Mar. 22, 1977

[54] OPTICAL SYSTEM FOR REPRODUCTION
[75] Inventor: Yu Yamada, Kokubunji, Japan
[73] Assignee: Canon Kabushiki Kaisha, Tokyo, Japan
[22] Filed: May 7, 1975
[21] Appl. No.: 575,263
[30] Foreign Application Priority Data
  May 13, 1974  Japan ............... 49-53001
[52] U.S. Cl. .................. 350/196; 350/210; 350/215; 350/235
[51] Int. Cl.² ............................ G02B 9/60
[58] Field of Search ......... 350/196, 215, 235, 192, 350/311, 208, 210

[56] References Cited
UNITED STATES PATENTS

| | | | |
|---|---|---|---|
| 3,414,345 | 12/1968 | Mollring | 350/196 |
| 3,439,976 | 4/1969 | Lynch | 350/215 |
| 3,524,697 | 8/1970 | Isshiki et al. | 350/196 |
| 3,728,752 | 10/1966 | Brixner | 350/208 |

Primary Examiner—John K. Corbin
Assistant Examiner—Conrad Clark
Attorney, Agent, or Firm—Toren, McGeady and Stanger

[57] ABSTRACT

The present invention relates to an optical system for color reproduction with nearly an equal magnification factor consisting of the front lens group and the rear lens group. The front lens group and the rear lens group have a symmetrical form to each other with respect to the diaphragm as center of symmetry being provided between both lens groups. Between both lens groups, the filters corresponding to the three primary colors of the light are provided so as to be interchangeable.

2 Claims, 2 Drawing Figures

OPTICAL SYSTEM FOR REPRODUCTION

BACKGROUND OF THE INVENTION

1. Field of the Invention

The present invention relates to an optical system suited for the reproduction of especially a color manuscript, more particularly, an optical system presenting substantially symmetrical lenses comprising some lenses which are somewhat unsymmetrical, whereby the lenses for projecting the manuscript are of symmetrical arrangement, while a space in which the filter is to be inserted, is provided.

2. Disclosure of the Prior Art

For the image forming lens with almost an equal magnification factor to be used for the manuscript reproduction machine capable of reproducing the color manuscript, it has to be taken into consideration that the lens should have a good permeability for the light beam with wave length 400 m$\mu$ to 700 m$\mu$ (from the blue light to the red light), that the chromatic aberration should strictly be compensated and that the filter as means for color resolution can be inserted in the optical path.

Hereby, the place in which the filter should be provided is thought to be between the light source for illuminating the manuscript to be reproduced and the manuscript. However, in the case of the ordinary reproduction machine, a light source in the form of a bar with a length nearly corresponding to the width of the manuscript is provided close to the above mentioned manuscript in order to obtain a homogeneous illumination.

Therefore, if a filter should be provided between the light source and the surface of the manuscript, the size of the filter would be large, because the length of the filter should be nearly equal to the width of the manuscript, whereby further the filter would be apt to be damaged due to the influence of the heat produced by the light source, which is very inconvenient. Further it is conceivable that the filter could be provided between the reproducing optical system and the light sensitive body, whereby the size of the filter would also be large.

Further, in the case of color reproduction, three kinds of filters in accordance with the three primary colors are provided so as to be put in and taken out of the reproduction optical system for the production of one manuscript in such a manner that the reproduction is carried out for each filter and the colors are composed on the photosensitive body so as to reproduce the color manuscript. Thus at least three filters in accordance with the primary color of the light are necessary whereby it is necessary to form the filters as small as possible in order to prevent the mechanism for the exchange of the filters from becoming large so as to facilitate the exchange of the filters.

Thus the objects of the present invention are as follows, the above being taken into consideration.

The first object of the present invention is to offer an optical system, designed to be compact, as a color reproduction optical system with a plural number of filters.

The second object of the present invention is to offer an image forming lens with good permeability in the range of visible light (400 m$\mu$–700 m$\mu$).

The third object of the present invention is to offer an image forming lens whose aberrations, especially chromatic aberrations are strictly compensated.

Further other objects and features of the present invention will be disclosed hereinbelow.

SUMMARY OF THE INVENTION

The image forming lens to be applied for the reproduction optical system in accordance with the present invention presents a nearly equal magnification factor, consisting of two lens groups, namely a front lens group and a rear lens group, both lens groups being substantially symmetrical to each other whereby the filters for resolving the three primary colors are provided at the position at which the diameter of the light beam becomes smallest between the above mentioned front lens group and the above mentioned rear lens group in the image forming group. Hereby the image forming lens of symmetrical type is so composed with regard to the diaphragm provided nearly at the center of the image forming lens as center of symmetry that from the outside toward the inside the plano-convex lens with the surface with larger radius of curvature pointing to the inside, the equiconcurve lens with the surface with smaller radius of curvature pointing to the inside and the positive meniscus lens with convex surface pointing to the outside are provided whereby between the lenses an air spaces are provided. Below the present invention will be explained in detail in accordance with the embodiment of the present invention.

DETAILED DESCRIPTION OF PREFERRED EMBODIMENT

Figure 1:
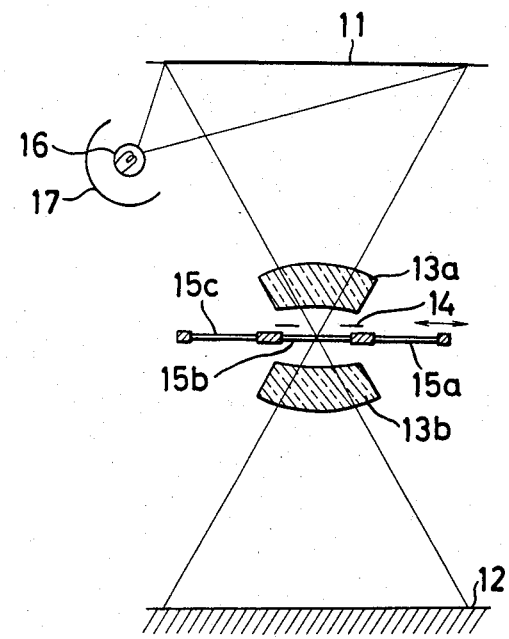
FIG. 1 shows a section of the reproduction optical system in accordance with the present invention.

FIG. 1 shows a section of the optical system comprising the image forming lens of substantially symmetrical type. In FIG. 1, 11 is the manuscript such as a document, 12 the photosensitive body, 13a and 13b the components for composing a lens of symmetrical type and 14 the diaphragm. 15a, 15b and 15c are the filters, for example, corresponding to the three primary colors and are inserted in the optical path of the projecting optical system one after another in accordance with necessity. 16 is the light source in the form of a bar and 17 the reflecting mirror. The light beam coming from the light source 16 and being dispersed by the surface of the manuscript is focussed on the photosensitive body 12 so as to form an image by means of the lens 13a, the diaphragm, the filter provided in the neighborhood of the center of the symmetry of the image forming lens (13a, 13b) of the symmetrical type at which center the light beam is converged and the lens (13b).

Figure 2:
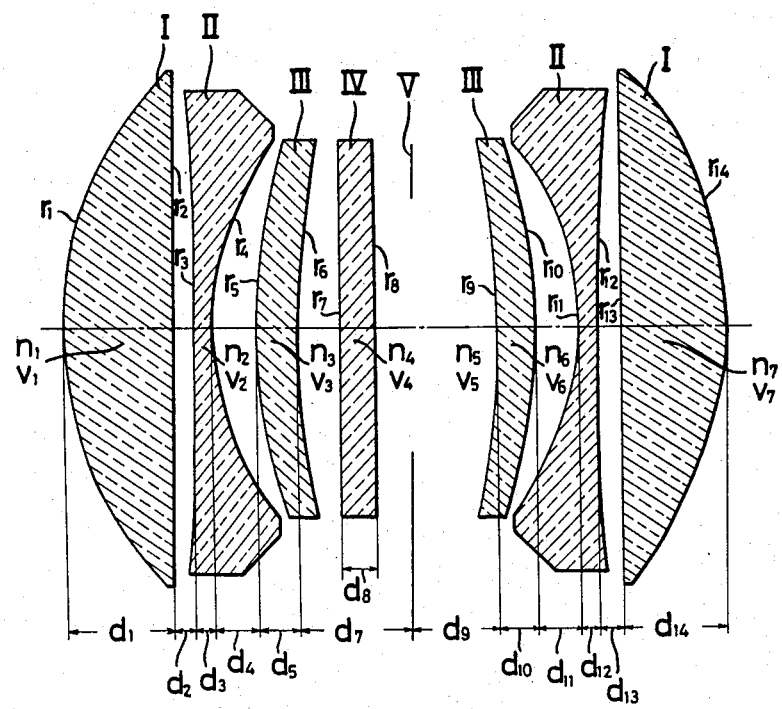
FIG. 2 shows a section of the image forming lens in accordance with the present invention.

FIG. 2 shows the above mentioned image forming lens of symmetrical type, which is, when the position at which the diaphragm is provided is supposed inside, so designed that, from the outside toward the inside, the positive lenses (I, I) with surface with larger radius of curvature pointing to the inside, the negative lenses (II, II) with surface with smaller radius of curvature pointing to the inside and the positive lenses (III, III) with the convex surface with small radius of curvature pointing to the outside are provided whereby at an optional position in the diaphragm space between the lenses (III, III) the interchangeable filter IV is provided.

To explain the form of the above mentioned image forming lens more in detail, the above mentioned positive lens I is a plano-convex lens having a convex surface with large radius of curvature pointing to outside and a surface with infinite radius of curvature pointing to inside, the negative lens II is an equiconcurve lens having a surface with large radius of curvature pointing to outside and a surface with small radius of curvature pointing to inside and the positive lens is a positive meniscus lens having a concave surface with large diameter pointing to inside. Hereby the above mentioned positive lens I consists of dense barium crown glass, the above mentioned negative lens II of light flint glass, the above mentioned positive meniscus lens III of barium flint glass and the filter III of borosilicate crown glass.

Below a lens ($F = 5$, Picture angle 40°, Magnification: 1–1.6, Focus distance: 280 mm) is mentioned as an embodiment.

In FIG. 2, let $r_1$–$r_{14}$ be radii of curvature
$d_1$–$d_{14}$ be thickness of air spaces and lenses
$n_1$–$n_7$ be refractive index of lenses for $d$-line
$\nu_1$–$\nu_7$ be dispersion of lenses for $d$-line
$f$ be the focus distance, so

| | |
|---|---|
| $r_1 = -r_{14} = 0.22689\ f$ | $d_1 = d_{14} = 0.0641808\ f$ |
| $r_2 = -r_{13} = \infty$ | $d_2 = d_{13} = 0.0135136\ f$ |
| $r_3 = -r_{12} = -3.74228\ f$ | $d_3 = d_{12} = 0.0110534\ f$ |
| $r_4 = -r_{11} = 0.177267\ f$ | $d_4 = d_{11} = 0.0249592\ f$ |
| $r_5 = -r_{10} = 0.322519\ f$ | $d_5 = d_{10} = 0.260289\ f$ |
| $r_6 = -r_9 = 0.564898\ f$ | $d_7 = 0.0695292\ f$ |
| $r_7 = \infty$ | $d_8 = 0.0213936\ f$ |
| $r_8 = \infty$ | $d_9 = 0.0508455\ f$ |
| $n_1 = n_7 = 1.63854$ | $\nu_1 = \nu_7 = 55.4$ |
| $n_2 = n_6 = 1.58215$ | $\nu_2 = \nu_6 = 42.1$ |
| $n_3 = n_5 = 1.60729$ | $\nu_3 = \nu_5 = 49.3$ |
| $n_4 = 1.51633$ | $\nu_4 = 64.1$ |

As the filter in accordance with the present invention, either of the glass filter, the gelative filter sandwiched between glass plates or the glass base plate with interference coating on it can be applied whereby it goes without saying that the filter with interference coating has the best efficiency from the view point of the color resolving power.

Hereby it is necessary to form several layers of coating in the vacuum metal deposition tank in order to manufacture the interference filter so that it is hard to obtain a homogeneous thin coating when the size of the filter is large while it is hard to produce many filters in one process, which is very inconvenient, whereby the cost due to the latter is one of the factors for raising the cost of the whole equipment. In accordance with the present invention, the filter is provided at the position at which the diameter of the projected light beam is smallest so that the filter of small size already suffices. Namely in accordance with the present invention, the manufacturing cost can remarkably reduced as compared with other filters to be provided at other places, having the length of the one base nearly corresponding to the width of the manuscript and the other base with considerably large width.

What is claimed is:

1. An optical system for reproduction having the following lens specifications:

the F-number of the image forming lens: 5
the picture angle: 40°
the magnification factor: 1–1.6
the focus distance: 280 mm

| | |
|---|---|
| $r_1 = -r_{14} = 0.226896\ f$ | $d_1 = d_{14} = 0.0641808\ f$ |
| $r_2 = -r_{13} = \infty$ | $d_2 = d_{13} = 0.0135136\ f$ |
| $r_3 = -r_{12} = -3.74228\ f$ | $d_3 = d_{12} = 0.0110534\ f$ |
| $r_4 = -r_{11} = 1.77267\ f$ | $d_4 = d_{11} = 0.0249592\ f$ |
| $r_5 = -r_{10} = 0.322519\ f$ | $d_5 = d_{10} = 0.0260289\ f$ |
| $r_6 = -r_9 = 0.564898\ f$ | $d_7 = 0.0695292\ f$ |
| $r_7 = \infty$ | $d_8 = 0.0213936\ f$ |
| $r_8 = \infty$ | $d_9 = 0.0508455\ f$ |
| $n_1 = n_7 = 1.63854$ | $\nu_1 = \nu_7 = 55.4$ |
| $n_2 = n_6 = 1.58215$ | $\nu_2 = \nu_6 = 42.1$ |
| $n_3 = n_5 = 1.60729$ | $\nu_3 = \nu_5 = 49.3$ |
| $n_4 = 1.51633$ | $\nu_4 = 64.1$ | whereby
$f$ = focus distance
$r_1$ – $r_{14}$: radius of curvature
$d_1$ – $d_{14}$: thickness of air spaces and lenses
$n_1$ – $n_7$: refractive index of lenses for $d$-line
$\nu_1$ – $\nu_7$: dispersion of lenses for $d$-line
$r_7$, $r_8$: radius of curvature
$n_4$: refractive index of filter for $d$-line
$\nu_4$: dispersion of filter for $d$-line.

2. A color reproduction optical system comprising:
an illumination light source for illuminating a colored manuscript;
an image forming lens of symmetrical type for projecting the light beam reflected from the manuscript on the photosensitive body, consisting of a front group and the rear group whereby both groups are substantially symmetrical with respect to a central plane;
a diaphragm provided between the front group and the rear group of the image forming lens and interchangeable interference filters to be put between the front group and the rear group of the image forming lens;
the image forming lens of symmetrical type being composed so that, from the outside elements toward the inside elements on both sides of the diaphragm, the positive lenses having a surface with large radius of curvature facing the inside, a negative lens having a surface with small radius of curvature facing the inside and a positive lens having convex surface with small radius of curvature facing the outsides are provided, whereby there exist air spaces between each lens while the filters are those corresponding to the three primary colors of the light; and
in which the front lens group and the rear lens group are respectively so composed that, from the outside elements toward the inside elements on both sides of the diaphragm, the plano-convex lenses having a surface with infinite radius of curvature facing the inside, the double concave lenses having a surface with large radius of curvature facing the outside and a surface with small radius curvature facing the inside and the positive meniscus lenses having a convex surface with small radius of curvature facing the outside are provided, and in which the image forming lens has the following specifications the F-number of the image forming lens: 5
the picture angle: 40°
the magnification factor: 1–1.6
the focus, distance: 280 mm

| | |
|---|---|
| $r_1 = -r_{14} = 0.226896\ f$ | $d_1 = d_{14} = 0.0641808\ f$ |
| $r_2 = -r_{13} = \infty$ | $d_2 = d_{13} = 0.0135136\ f$ |
| $r_3 = -r_{12} = -3.74228\ f$ | $d_3 = d_{12} = 0.0110534\ f$ |

-continued

| | |
|---|---|
| $r_4 = -r_{11} = 1.77267\,f$ | $d_4 = d_{11} = 0.0249592\,f$ |
| $r_5 = -r_{10} = 0.322519\,f$ | $d_5 = d_{10} = 0.0260289\,f$ |
| $r_6 = -r_9 = 0.564898\,f$ | $d_7 = 0.0695292\,f$ |
| $r_7 = \infty$ | $d_8 = 0.0213936\,f$ |
| $r_8 = \infty$ | $d_9 = 0.0508455\,f$ |
| $n_1 = n_7 = 1.63854$ | $v_1 = v_7 = 55.4$ |
| $n_2 = n_6 = 1.58215$ | $v_2 = v_6 = 42.1$ |
| $n_3 = n_5 = 1.60729$ | $v_3 = v_5 = 49.3$ |

-continued

| | |
|---|---|
| $n_4 = 1.51633$ | $v_4 = 64.1$ | whereby
$f =$ focus distance
$r_1$–$r_{14}$: radius of curvature
$d_1$–$d_{14}$: thickness of air spaces and lenses
$n_1$–$n_7$: refractive index of lenses for $d$-line
$v_1 - v_7$: dispersion of lenses for $d$-line
$r_7, r_8$: radius of curvature
$n_4$: refractive index of filter for $d$-line
$v_4$: dispersion of filter for $d$-line

* * * * *